United States Patent
Zhang et al.

(10) Patent No.: US 11,727,165 B2
(45) Date of Patent: Aug. 15, 2023

(54) PRESSURE-RESISTANT HULL FOR A SUBMERSIBLE AND DESIGN METHOD THEREFOR

(71) Applicant: JIANGSU UNIVERSITY OF SCIENCE AND TECHNOLOGY, Zhenjiang (CN)

(72) Inventors: Jian Zhang, Zhenjiang (CN); Rui Wang, Zhenjiang (CN); Chenyang Di, Zhenjiang (CN); Wenxian Tang, Zhenjiang (CN); Xin Wang, Zhenjiang (CN); Baoji Yin, Zhenjiang (CN); Shijie Su, Zhenjiang (CN); Yongmei Zhu, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/996,241

(22) PCT Filed: Apr. 16, 2021

(86) PCT No.: PCT/CN2021/087776
§ 371 (c)(1),
(2) Date: Oct. 14, 2022

(87) PCT Pub. No.: WO2022/041788
PCT Pub. Date: Mar. 3, 2022

(65) Prior Publication Data
US 2023/0080177 A1 Mar. 16, 2023

(30) Foreign Application Priority Data

Aug. 28, 2020 (CN) .......................... 202010891815.9

(51) Int. Cl.
*G06F 30/15* (2020.01)
*G06F 119/14* (2020.01)

(52) U.S. Cl.
CPC .......... *G06F 30/15* (2020.01); *G06F 2119/14* (2020.01)

(58) Field of Classification Search
CPC ...... G06F 30/00; G06F 30/15; G06F 2119/14; G06F 30/17
(Continued)

(56) References Cited

U.S. PATENT DOCUMENTS 3,933,109 A  1/1976 Boisrayon et al.

FOREIGN PATENT DOCUMENTS

| CN | 104986312 A | * 10/2015 |
| CN | 104986312 A | 10/2015 |

(Continued)

OTHER PUBLICATIONS

Binbin, Pan et al. "On an Appropriate Design and Test Standard for Spherical Pressure Hull in a Deep Manned Submersible", Apr. 5-8, 2011, Advanced Underwater Technology for the Ocean Symposium on Underwater Technology, IEEE. (Year: 2011).*

(Continued)

*Primary Examiner* — Cedric Johnson
(74) *Attorney, Agent, or Firm* — Hauptman Ham, LLP (57) ABSTRACT

A pressure-resistant hull for a submersible, includes unit hulls, reinforcing ribs, connecting channels, and closure heads. A plurality of unit hulls are provided, and are sequentially strung together spiralling upward or spiralling downward, the closure heads being arranged on the unit hulls at the first position and the last position respectively, an observation window being provided on each unit hull respectively, adjacent two unit hulls in a horizontal direction being respectively connected by means of a reinforcing rib, (Continued)

and at least two connecting channels being provided between adjacent two rings of the unit hulls in the vertical direction. The design method includes using a spiral joining structure to facilitate organic adjustment of the number of unit hulls, thus having better utilization of space and aiding to greatly expand the space. The sensitivity of the limit load to defects is low, increasing axial rigidity, improving the overall pressure-resistive ability.

10 Claims, 7 Drawing Sheets

(58) Field of Classification Search
USPC .......................................................... 703/8, 6
See application file for complete search history.

(56) References Cited

FOREIGN PATENT DOCUMENTS

| CN | 105216995 | A | * | 1/2016 | | |
| CN | 105216995 | A | | 1/2016 | | |
| CN | 105631165 | A | * | 6/2016 | ............... | B63B 3/13 |
| CN | 105631165 | A | | 6/2016 | | |
| CN | 111252186 | A | * | 6/2020 | ............... | B23P 15/00 |
| CN | 111252186 | A | | 6/2020 | | |
| CN | 112149220 | A | * | 12/2020 | ............... | G06F 30/15 |
| CN | 112149220 | A | | 12/2020 | | |
| GB | 113397 | A | | 2/1918 | | |
| WO | 2003101828 | A1 | | 12/2003 | | |

OTHER PUBLICATIONS

Zhang, Jian, "Research on Egg Shaped Pressure Hulls of Deep manned Submersibles", 2018, Thesis for the Degree of Doctor of Engineering, Department of System Engineering, Graduate School of Engineering, Saitama Institute of Technology. (Year: 2018).*
Zhang, Jian et al, "Investigation on Egg-Shaped Pressure Hulls", 2016, Marine Structures 52, Elsevier, Ltd. (Year: 2016).*
Luo, Shan et al; Status and prospects on the pressure shell structure of submersible; Ship Science and Technology; vol. 41, No. 10, Oct. 31, 2019; 10 pgs.
Zhang, Jian et al; Bionic Investigation on Multiple Intersecting Egg-shaped Pressure Hulls; China Mechanical Engineering, vol. 27, No. 19; Oct. 2016; pp. 2668-2674.
Palaniappan, Kannappa P. et al; Numerical Study of a Twin Sphere Pressure Hull and Outer Fairing for Manned Submersible; 2015 IEEE Underwater Technology (UT), Feb. 23, 2015; 11 pgs.
Written Opinion of the International Searching issued in International Application No. PCT/CN2021/087776; dated Jun. 30, 2021; 6 pgs.
International Search Report issued in International Application No. PCT/CN2021/087776; dated Jun. 30, 2021; 6 pgs.

* cited by examiner

PRESSURE-RESISTANT HULL FOR A SUBMERSIBLE AND DESIGN METHOD THEREFOR

RELATED APPLICATIONS

The present application is a U.S. National Phase of International Application Number PCT/CN2021/087776, filed Apr. 16, 2021, and claims priority to Chinese Application Number 202010891815.9, filed Aug. 28, 2020.

TECHNICAL FIELD

The present disclosure relates to a submersible, and in particular to a pressure-resistant hull for a submersible and a design method therefor.

BACKGROUND

As the speed of ocean development continues to accelerate, and the depth of exploration from near sea to far sea continues to increase, various types of submersibles for the purpose of operations are increasing and developing rapidly. Their substantial utilizations include marine resource exploration and development, scientific research, and military exploration, salvage, and the like.

Submersibles are subjected to high pressure and low temperature in the deep sea, and the flow of seawater will also cause the sway of the submersibles. However, on the contrary, the various instruments and equipment equipped by the submersibles often need to work under room temperature and normal pressure, and the aquanauts' living conditions also need to be similar to that on the land surface. Therefore, stringent requirements on the pressure-resistant structure of the submersible are imposed. At present, the pressure-resistant hulls of deep-sea submersibles are mostly in a spherical structure. The spherical hull are a symmetrical hull in its entirety, which is highly sensitive to defects. Thus, a small initial defect will also cause a rapidly decrease of their bearing capacity. In addition, due to the monotonousness of the pressure-resistant hulls, the aquanauts and the instruments and equipment co-exist in the same space, the space utilization of which is unreasonable, which is disadvantageous for the manufacture and maintenance of the submersibles.

SUMMARY

Objectives of the disclosure is as follows: in view of the above-mentioned deficiencies, the objectives of the present disclosure are to provide a pressure-resistant hull for a submersible, which can improve the bearing capacity of the hull, and optimize the space structure, and to provide a design method therefor.

The technical scheme is as follows: provided are a pressure-resistant hull for a submersible and a design method therefor, which includes unit hulls, reinforcing ribs, connecting channels, and closure heads. A plurality of the unit hulls are provided, which are sequentially strung together spiralling upward or spiralling downward. The closure heads are arranged on a unit hull at a first position and a unit hull at a last position respectively. An observation window are arranged on each unit hull respectively. Each adjacent two unit hulls in a horizontal direction are respectively connected by means of a reinforcing rib, and the at least two connecting channels are arranged between each adjacent two turns of unit hulls in a vertical direction.

Further, each unit hull is a hollow spherical hull-shaped structure, and an outer surface of the hollow spherical hull-shaped structure is provided with two connecting tangent planes arranged opposite to each other.

Further, two connecting channels are arranged between each adjacent two turns of the unit hulls, and are respectively arranged at an initial position and a middle position in a spiralling direction between the adjacent two turns of the unit hulls.

Preferably, two unit hulls at the first positions of each two adjacent turns are communicatively connected to each other through one connecting channel, and two unit hulls at the middle positions are communicatively connected to each other through the other connecting channel.

Further, a number of turns of the spiral arrangement of the unit hulls is at least three.

Further, each reinforcing rib is in an annular structure.

Further, a material of the unit hulls is Carbon Fiber Reinforced Plastic.

Further, a material of the unit hulls is ultra-high-strength steel.

Preferably, a strength of the unit hulls is greater than 1000 MPa.

A method for designing the above-mentioned pressure-resistant hull for the submersible includes the following steps.

In Step one, parameters for an equivalent annular hull are set.

The parameters for the equivalent annular hull include a rotation radius R, an annulus-section radius r, a working pressure $P_s$, an elastic modulus E and a Poisson's ratio $\mu$.

In Step two, a thickness t of the pressure-resistant hull is calculated according to a jordan formula, a calculation formula of which is as follows:

$$P_{Jo} = 0.1738E \left\{ \frac{(t/r)^7}{(R/r)^2} (1-\mu^2)^2 \right\}^{1/3}.$$

In Step three, each unit hull is taken as a spherical hull, and parameters for the unit hulls are set.

The set parameters for the unit hulls include an elastic modulus $E_1$, a Poisson's ratio $\mu_1$, a thickness $t_1$ of the spherical hull, and a radius $r_1$ of the spherical hull, where $E_1=E$, $\mu_1=\mu$, $t_1=t$, and $r_1=r$.

In Step four, parameters for the reinforcing ribs are designed.

The parameters for the reinforcing ribs include a radius $R_1$ of a spiral line, and a pitch B of the spiral line, where $R_1=R$, and $B>2r$.

In Step five, a rotation angle $\theta$ is calculated according to the spiral line equation, a calculation formula of which is:

$$\begin{cases} x = a\cos\theta \\ y = a\sin\theta \\ z = b\theta \end{cases},$$

where $a=R_1$, $$b = \frac{B}{2\pi}, \text{ and}$$

-continued $$\theta = \sqrt{\frac{(2\pi R_1)^2 + B^2}{R_1^2 + \left(\frac{B}{2\pi}\right)^2}}.$$

In Step six, a number n of the unit hulls per turn is calculated according to the rotation angle θ said in Step five, a calculation formula of which is:

$$n = \frac{360°}{\theta}.$$

In Step seven, an external diameter $D_r$ and an inner diameter $d_r$ of the reinforcing ribs are calculated, a calculation formula of which is:

$$D_r = 2(r_1 + t_1) \sin \alpha, \text{ and}$$

$$d_r = D_r - 2t_r,$$

where the intersecting angle is α, 30°≤α≤70°, and a thickness of the reinforcing ribs is $t_r$.

In Step eight, a width $L_r$ of the reinforcing ribs is calculated through a radial displacement formula of the entire spherical hull under a hydrostatic pressure:

$$\delta_s = \frac{P_s r_1^2 \sin\alpha (1-\mu)}{2Et_1},$$

where $P_s$ is a maximum working pressure of the pressure-resistant hull at a working depth,
E is the elastic modulus of the pressure-resistant hull material, which is equal to the value of the above-mentioned parameter, and
μ is the Poisson's ratio of the pressure-resistant hull material, which is equal to the value of the above-mentioned parameter;
a formula for the pressure exerted on the reinforcing ribs:

$$P_R = \frac{P_s r_1 \cos\alpha}{2L_r} + \frac{P_s r_1 \cos\alpha}{2L_r} + P_s = P_s\left(\frac{r_1 \cos\alpha}{L_r} + 1\right);$$

and
a displacement formula at the external diameter of the reinforcing rib:

$$\delta_r = \frac{P_R D_r}{2E}\left(\frac{D_r^2 + d_r^2}{D_r^2 - d_r^2} - \mu\right),$$

and
in order to meet the requirements for a deformation coordination between the spherical hulls and the reinforcing ribs to realize $\delta_s = \delta_r$, a calculation formula of $L_r$ is:

$$L_r = \frac{r_1 \cos\alpha}{\frac{r_1^2 \sin\alpha(1-\mu)}{t_1 D_r\left(\frac{D_r^2 + d_r^2}{D_r^2 - d_r^2} - \mu\right)} - 1}.$$

The beneficial effects are that: compared with the prior art, the present disclosure has the advantages that adopting the spiral intersecting structure facilitates the organic adjustment of the number of the unit hulls, which has the better space utilization rate, and is advantageous to significantly expand the space. Compared with a cylindrical hull and a common multi-sphere intersecting hull, the extreme load has low sensitivity to defects, thereby increasing the axial rigidity and improving the total pressure resistance, which has high safety. By adopting the method of connecting multiple sections of the identical hulls through flanges, the process is relatively simple, and the manufacturing cost is reduced. At the same time, the process of the design method is provided, which facilitates the design of the submersible.

BRIEF DESCRIPTION OF THE DRAWINGS

FIG. 10 illustrates a side view of the present disclosure.
1. closure head; 2. unit hull; 3. reinforcing rib; 4. observation window; 5. connecting channel.

DETAILED DESCRIPTION OF THE EMBODIMENTS

The present disclosure will be further clarified below in conjunction with the accompanying drawings and specific embodiments. It should be understood that those embodiments are only used to illustrate the present invention and not to limit the scope of the present disclosure.

Figure 8:
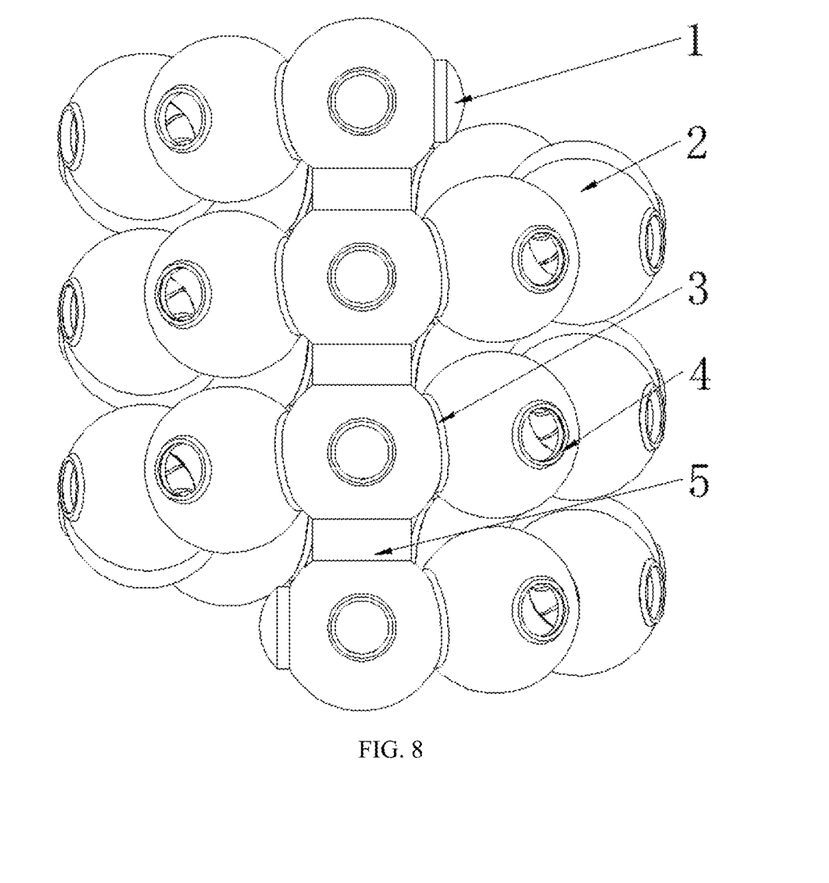
FIG. 8 illustrates a schematic front view of the present disclosure.
Figure 9:
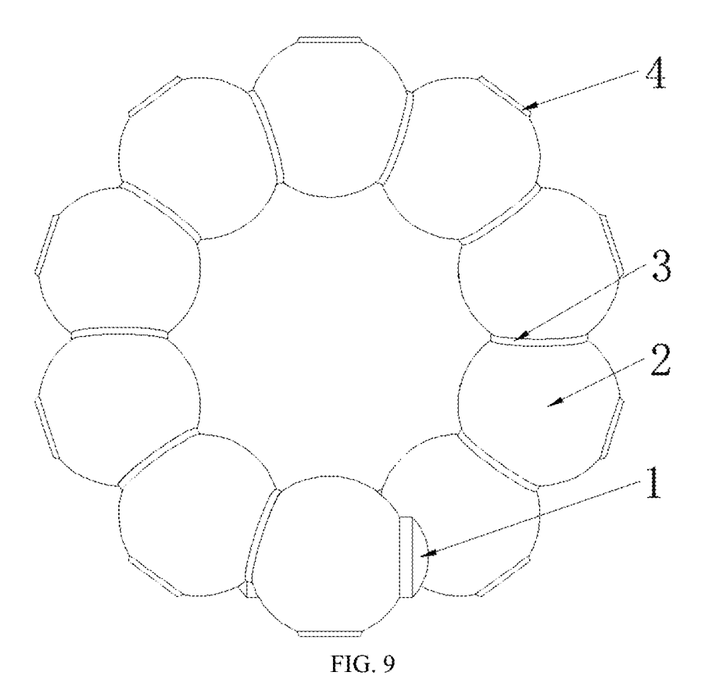
FIG. 9 illustrates a schematic top view of the present disclosure.
Figure 10:
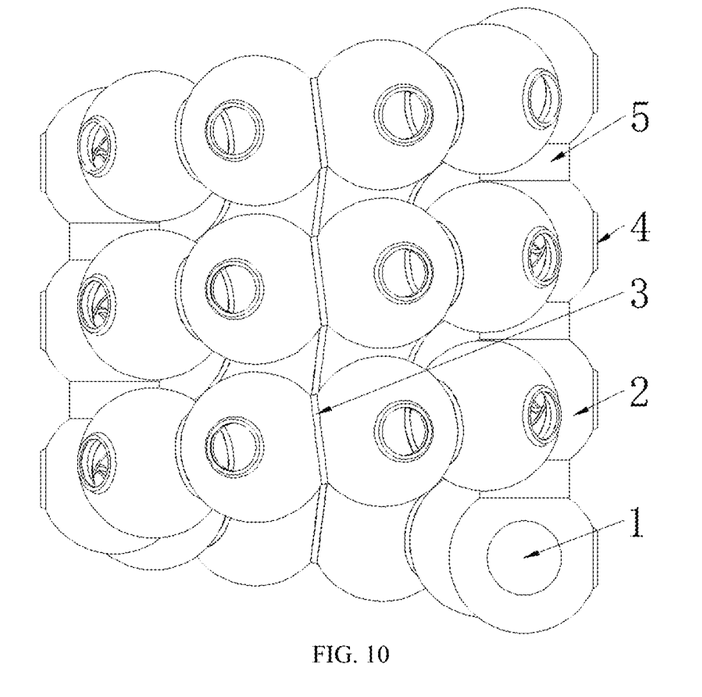

As illustrated in FIGS. 8 to 10, provided is a pressure-resistant hull for a submersible, which includes unit hulls 2, reinforcing ribs 3, connecting channels 5, and closure heads 1.

Each unit hull 2 is a hollow spherical hull-shaped structure, and the material of the unit hulls 2 is Carbon Fiber Reinforced Plastic or ultra-high-strength steel having the strength greater than 1000 MPa. The outer surface of the hollow spherical hull-shaped structure is provided with two connecting tangent planes arranged opposite to each other. A plurality of the unit hulls 2 are arranged, and are sequentially strung together spiralling upward or spiralling downward. The connecting tangent planes on two adjacent unit hulls 2 in the horizontal direction form a joint and are connected to each other by a reinforcing rib 3 at the joint. The reinforcing rib 3 is in an annular shape. The closure heads 1 are arranged on a unit hull 2 at a first position and a unit hull 2 at a last position respectively, which are configured to close the connecting tangent planes without a joint. The number of turns of the spiral arrangement of the unit hulls is at least three.

Each unit hull 2 is provided with an observation window 4 respectively. At least two connecting channels 5 are arranged between each adjacent two turns of the unit hulls 2 in a vertical direction. For example, two connecting channels 5 are provided. Two unit hulls 2 at the initial positions of adjacent two turns of the unit hulls in a vertical direction are connected to each other through one connecting channel 5, and two unit hulls 2 in the middle positions are connected through the other connecting channel 5.

Each unit hull of the pressure-resistant hull is a separate individual space, while the unit hulls on each turn (layer) are in communication with one another, so that each turn (layer) forms a larger individual space. Moreover, each turn (layer) is communicatively connected to each other through a connecting channel, so that each turn (layer) is in communication with one another, thereby forming the pressure-resistant hull.

The present pressure-resistant hull adopts the spiral intersecting structure to facilitate the organic adjustment of the number of the unit hulls, which has the better space utilization rate and is advantageous to significantly expand the space. Compared with a cylindrical hull and a common multi-sphere intersecting hull, the extreme load has low sensitivity to defects, thereby increasing the axial rigidity and improving the total pressure resistance, which has high safety. By adopting the method of connecting multiple sections of the identical hulls through flanges, the process is relatively simple, and the manufacturing cost is reduced.

As illustrated in FIGS. 1 to 7, provided is a method for designing a pressure-resistant hull for a submersible includes the following steps.

Figure 1:
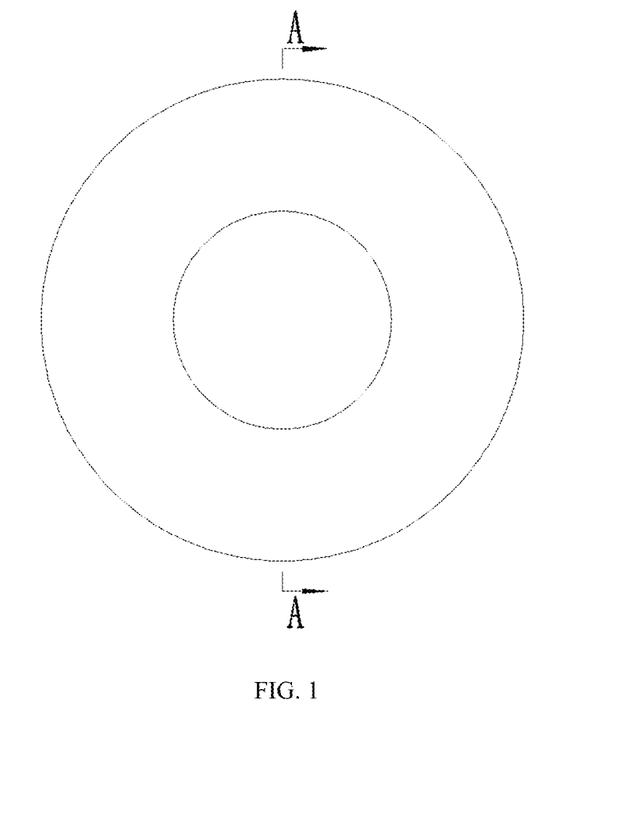
FIG. 1 illustrates a schematic structural diagram of an equivalent annular in the design method of the present disclosure.
Figure 2:
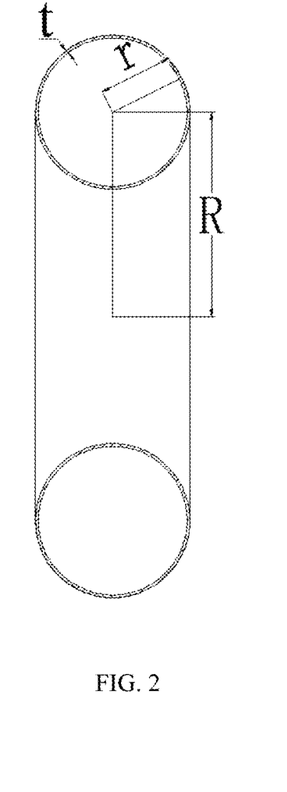
FIG. 2 illustrates a cross-sectional view taken along A-A of FIG. 1.

In Step one, parameters for an equivalent annular hull are set.

The parameters for the equivalent annular hull include a rotation radius R, an annulus-section radius r, a working pressure $P_s$, an elastic modulus E and a Poisson's ratio μ, where E=200 Gpa, μ=0.291, R=110 mm, r=40 mm, and $P_s$=4 Mpa.

Step two, a thickness t of the pressure-resistant hull is calculated according to a jordan formula, a calculation formula of which is as follows:

$$P_{J_o} = 0.1738E \left\{ \frac{(t/r)^7}{(R/r)^2} (1-\mu^2)^2 \right\}^{1/3},$$

whereby t=1.5012 mm is solved.

Figure 3:
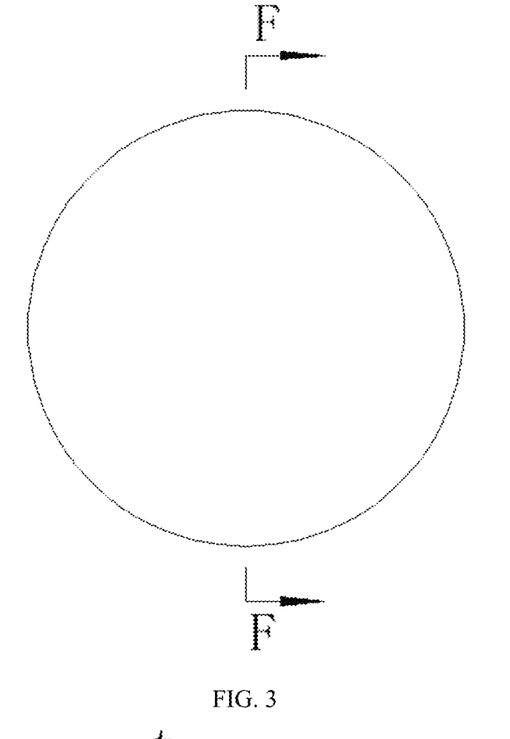
FIG. 3 illustrates a structure schematic diagram of a unit from the design method of the present disclosure.
Figure 4:
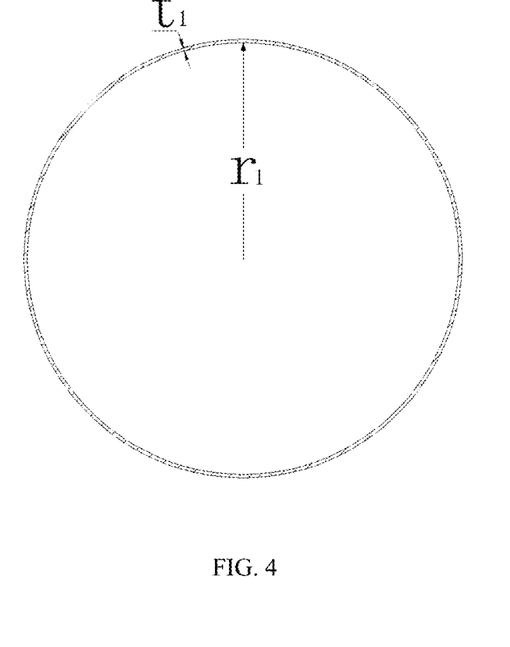
FIG. 4 illustrates a cross-sectional view taken along F-F of FIG. 3.

In Step three, parameters for the unit hulls 2 are set.

The set parameters for the unit hulls includes an elastic modulus $E_1$, a Poisson's ratio $\mu_1$, a thickness t of the spherical hull, and a radius $r_1$ of the spherical hull, where $E_1$=E, $\mu_1$=μ, $t_1$=t, and r1=r.

Figure 5:
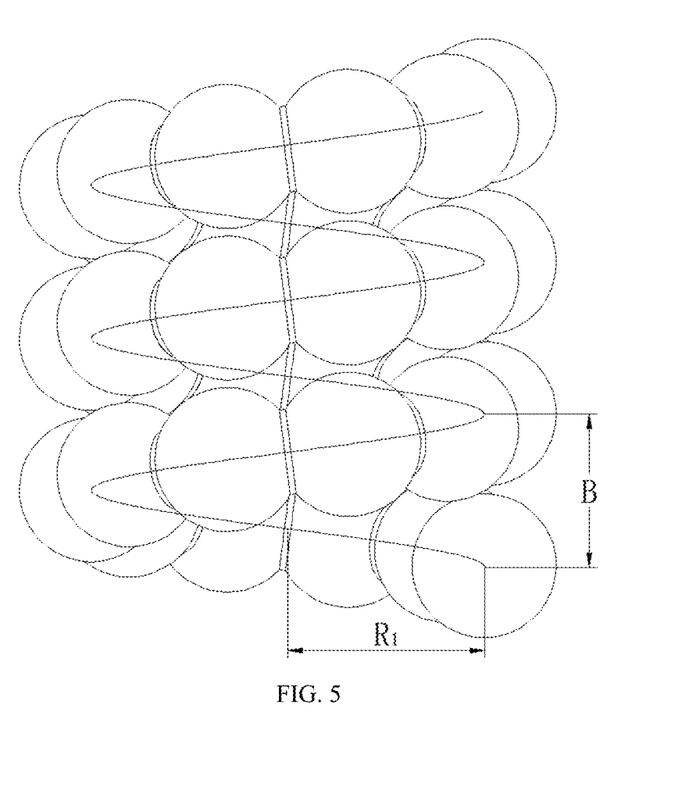
FIG. 5 illustrates a front view of a pressure-resistant hull from the design method of the present disclosure.
Figure 6:
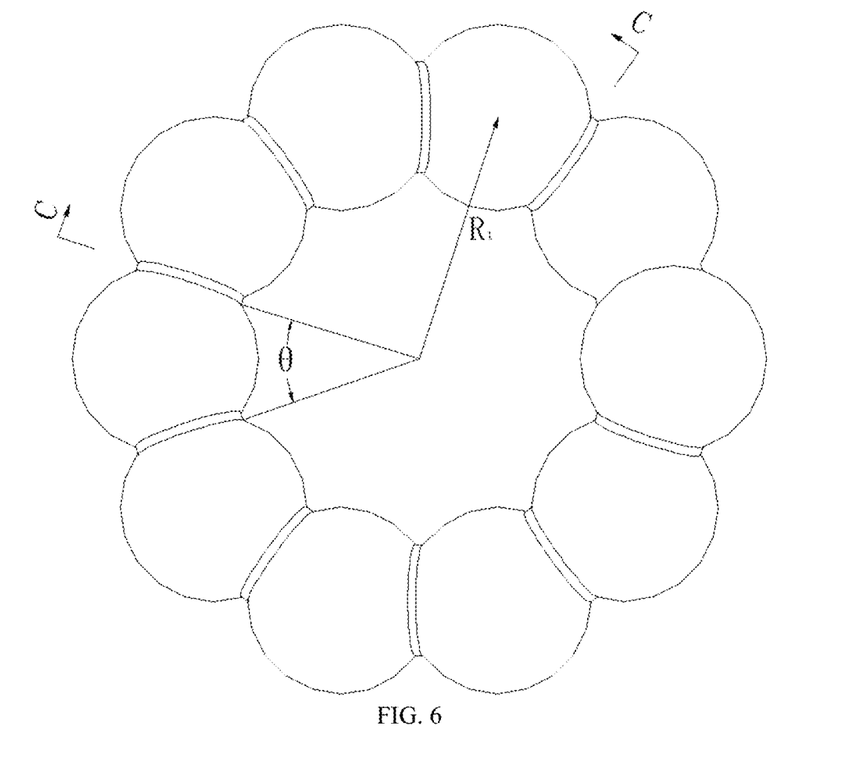
FIG. 6 illustrates a top view of a pressure-resistant hull from the design method of the present disclosure.
Figure 7:
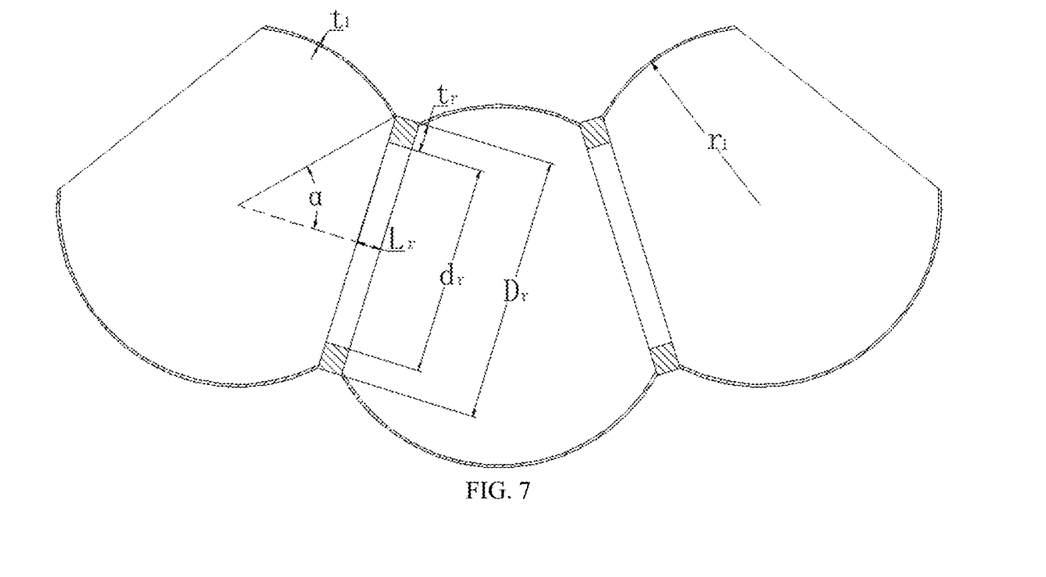
FIG. 7 illustrates a cross-sectional view taken along C-C of FIG. 6.

In Step four, parameters for the reinforcing ribs 3 are designed.

The parameters for the reinforcing ribs 3 include a radius $R_1$ of a spiral line, a pitch B of the spiral line, where R1=R, and B>2r, taking B=85 mm.

In Step five, a rotation angle θ is calculated according to the spiral line equation, a calculation formula of which is:

$$\begin{cases} x = a\cos\theta \\ y = a\sin\theta, \\ z = b\theta \end{cases}$$

where a=$R_1$, $$b = \frac{B}{2\pi}, \text{ and}$$

$$\theta = \sqrt{\frac{(2\pi R_1)^2 + B^2}{R_1^2 + \left(\frac{B}{2\pi}\right)^2}},$$

wherein the number of turns of the spiral arrangement is at least three, where θ=36°.

In Step six, the number n of the unit hulls 2 per turn is calculated according to the rotation angle θ said in Step five, a calculation formula of which is:

$$n = \frac{360°}{\theta},$$

where when θ=36°, n=10.

In Step seven, an external diameter $D_r$ and an inner diameter $d_r$ of the reinforcing ribs 3 are calculated, a calculation formula of which is:

$$D_r = 2(r_1 + t_1) \sin \alpha, \text{ and}$$

$$d_r = D_r - 2t_r,$$

where the intersecting angle is α, the intersecting angle α is an important geometric parameter for a multi-sphere intersecting pressure-resistant hull. According to the experiment of Kloppel and Jungbluth, 30°≤α≤70°, and a thickness of the reinforcing ribs 3 is $t_r$, where α=45°, and tr=15 mm, Dr=58.6915 mm, and dr=28.6915 mm are solved.

The buckling behavior of an entire spherical hull depends on t/R, while the buckling behavior of a multi-sphere intersecting pressure-resistant hull is further constrained by the annular reinforcing ribs. The thickness and length of the reinforcing ribs have a great influence on the multi-sphere intersection. Therefore, in order to ensure that the mechanical properties and stability of the spherical hulls of the multi-sphere intersecting pressure-resistant hull are not affected after the intersection, the design concept of deformation coordination shall be adopted when designing the multi-sphere intersection, the objective of which is to make the deformation of the part of the annular reinforcing ribs in the intersection part consistent with the deformation of the entire spherical hull.

In Step eight, a width $L_r$ of the reinforcing ribs is calculated according to deformation coordination theory.

Through a radial displacement formula of the entire spherical hull under a hydrostatic pressure:

$$\delta_s = \frac{P_s r_1^2 \sin\alpha (1-\mu)}{2Et_1},$$

where $P_s$ is a maximum working pressure of the pressure-resistant hull at a working depth,
E is the Elastic modulus of the pressure-resistant hull material, which is equal to the value of the above-mentioned parameter;
μ is the Poisson's ratio of the pressure-resistant hull material, which is equal to the value of the above-mentioned parameter;
a formula for the pressure exerted on the reinforcing ribs 3:

$$P_R = \frac{P_s r_1 \cos\alpha}{2L_r} + \frac{P_s r_1 \cos\alpha}{2L_r} + P_s = P_s\left(\frac{r_1 \cos\alpha}{L_r} + 1\right);$$

and
a displacement formula at the external diameter of the reinforcing ribs 3:

$$\delta_r = \frac{P_R D_r}{2E}\left(\frac{D_r^2 + d_r^2}{D_r^2 - d_r^2} - \mu\right);$$

and in order to meet the requirements for a deformation coordination between the spherical hulls and the reinforcing ribs 3, to realise $\delta_s = \delta_r$, a calculation formula of $L_r$ is:

$$L_r = \frac{r_1 \cos\alpha}{\dfrac{r_1^2 \sin\alpha(1-\mu)}{t_1 D_r\left(\dfrac{D_r^2 + d_r^2}{D_r^2 - d_r^2} - \mu\right)} - 1}.$$

The parameters are substituted to solve $L_r$=4.8689 mm.

Comparing the pressure-resistant hull of the present disclosure with a common spiral pressure-resistant hull:

1. Geometric Dimensions Selection:

The geometric dimensions of the pressure-resistant hull obtained from the above-mentioned design method, are shown in the following table:

| Model | n | B(mm) | Number of turns | $R_1$(mm) | $r_1$(mm) | $t_1$(mm) | $t_r$(mm) | $L_r$(mm) | α (°) |
|---|---|---|---|---|---|---|---|---|---|
| Spiral pressure-resistant hull | 10 | 85 | 3 | 110 | 40 | 1.5012 | 15 | 4.8689 | 45 |

For the common spiral pressure-resistant hull, still taking the spiral-line radius $R_2$=R=110 mm, B=85 mm, the number of turns is 3 turns, and according to the principle of equal volume and thickness: $t_2$=$t_1$=1.5012 mm, and $r_2$=35.7613 mm are solved.

The geometric dimensions of the common spiral pressure-resistant hull are shown in the following table:

| Model | $R_2$(mm) | Number of turns | $r_2$(mm) | $t_2$(mm) | B(mm) |
|---|---|---|---|---|---|
| Common spiral pressure-resistant hull | 110 | 3 | 35.7613 | 1.5012 | 85 |

2. Comparison of Bearing Capacities

In the embodiment, the bearing capacity of the pressure-resistant hull of the present disclosure solved by adopting the following method is obviously higher than that of the common spiral pressure-resistant hull, and the specific solution method is as follows.

The elastic modulus E of the pressure-resistant hull material=200 Gpa, the Poisson's ratio μ=0.291, and the buckling strength $\sigma_s$=680 Mpa.

In Step one, three-dimensional models are created, that is, three-dimensional surface modeling is performed by utilizing the three-dimensional modeling software SolidWorks for the pressure-resistant hull of the present disclosure and the common spiral pressure-resistant hull.

In Step two, meshes are divided, that is, the meshes of the three-dimensional models in Step one are divided by adopting the software ansa, where the meshes are in a quadrilateral shape, and the number of the meshes is about 10000.

In Step 3, the critical pressure is solved, that is, by adopting the software Abaqus and calculating through the Riks method, the meshes in each three-dimensional model in Step two are compared, where the boundary conditions are classical three-point boundary conditions, and the detailed solving parameters of the Riks method are set as follows: the initial increment is 0.2, the minimum increment is 10^-50, the maximum increment is 0.5, and the maximum increment step number is 1000.

The bearing capacity calculation results are as follows:

| Model | Riks (MPa) |
|---|---|
| Common spiral pressure-resistant hull | 9.79065 |
| Spiral pressure-resistant hull | 42.9378 |

It can be seen from the above table that the bearing capacity of the present disclosure is significantly higher than that of the common spiral pressure-resistant hull.

What is claimed is:

1. A pressure-resistant hull for a submersible, wherein the pressure-resistant hull comprises;
   unit hulls;
   reinforcing ribs;
   connecting channels; and
   closure heads;
   a plurality of the unit hulls arranged, and sequentially strung together spiralling upward or spiralling downward;
   the closure heads arranged on the unit hulls at a first position and a last position respectively;
   each unit hull provided with an observation window respectively;
   each adjacent two unit hulls in a horizontal direction connected to each other by means of one of the reinforcing ribs; and
   at least two of the connecting channels arranged between each adjacent two turns of the unit hulls in a vertical direction.

2. The pressure-resistant hull for the submersible according to claim 1, wherein the unit hulls are in a hollow spherical hull-shaped structure, and an outer surface of the hollow spherical hull-shaped structure is provided with two connecting tangent planes arranged opposite to each other.

3. The pressure-resistant hull for the submersible according to claim 1, wherein two of the connecting channels are arranged between each adjacent two turns of the unit hulls, and are respectively arranged at an initial position and a middle position in a spiralling direction between the adjacent two turns of the unit hulls.

4. The pressure-resistant hull for the submersible according to claim 3, wherein two unit hulls at first positions of the each two adjacent turns of the unit hulls are connected to each other through one of the connecting channels, and two unit hulls at middle positions are connected to each other through another one of the connecting channels.

5. The pressure-resistant hull for the submersible according to claim 1, wherein a number of turns of a spiral arrangement of the unit hulls is at least three.

6. The pressure-resistant hull for the submersible according to claim 1, wherein the reinforcing ribs are in an annular structure.

7. The pressure-resistant hull for the submersible according to claim 1, wherein a material of the unit hulls is Carbon Fiber Reinforced Plastic.

8. The pressure-resistant hull for the submersible according to claim 1, wherein a material of the unit hulls is ultra-high-strength steel.

9. The pressure-resistant hull for the submersible according to claim 8, wherein a strength of the unit hulls is greater than 1000 MPa.

10. A method for designing the pressure-resistant hull for the submersible according to claim 1, comprising following steps:
Step one, setting parameters for an equivalent annular hull:
the parameters for the equivalent annular hull include a rotation radius R, an annulus-section radius r, a working pressure $P_s$, an elastic modulus E and a Poisson's ratio $\mu$;
Step two, calculating a thickness t of the pressure-resistant hull according to a jordan formula ($P_{Jo}$), a calculation formula of which is as follows:

$$P_{Jo} = 0.1738E\left\{\frac{(t/r)^7}{(R/r)^2}(1-\mu^2)^2\right\}^{1/3};$$

Step three, taking the unit hulls as spherical hulls, and setting parameters for the unit hulls:
wherein the set parameters for the unit hulls include an elastic modulus $E_1$, a Poisson's ratio $\mu_1$, a thickness $t_1$ of the spherical hulls, and a radius $r_1$ of the spherical hulls, where $E_1=E$, $\mu_1=\mu$, $t_1=t$, and $r1=r$;
Step four, designing parameters for the reinforcing ribs:
wherein the parameters for the reinforcing ribs include a radius $R_1$ of a spiral-line, and a pitch B of the spiral line, where $R_1=R$, and $B>2r$;
Step five, calculating a rotation angle $\theta$ according to a spiral line equation;
Step six, calculating a number n of unit hulls per turn according to the rotation angle $\theta$ mentioned in Step five, a calculation formula of which is:

$$n = \frac{360°}{\theta};$$

Step seven, calculating an external diameter $D_r$ and an inner diameter $d_r$ of the reinforcing ribs, a calculation formula of which is:

$$D_r=2(r_1+t_1)\sin\alpha,$$

$$d_r=D_r-2t_r, \text{ and}$$

where an intersecting angle is $\alpha$, $30°\leq\alpha\leq70°$, and a thickness of the annular reinforcing ribs is $t_r$; and
Step eight, calculating a width $L_r$ of the reinforcing ribs, through a radial displacement formula of an entire spherical hull under a hydrostatic pressure ($\delta_s$):

$$\delta_s = \frac{P_s r_1^2 \sin\alpha(1-\mu)}{2Et_1},$$

where $P_s$ is a maximum working pressure of the pressure-resistant hull at a working depth,
E is an Elastic modulus of a material of the pressure-resistant hull, and is equal to a value for the said parameter, and
$\mu$ is a Poisson's ratio of the material of the pressure-resistant hull, and is equal to a value for the said parameter;
a formula for pressures ($P_R$) exerted on the reinforcing ribs:

$$P_R = \frac{P_s r_1 \cos\alpha}{2L_r} + \frac{P_s r_1 \cos\alpha}{2L_r} + P_s = P_s\left(\frac{r_1\cos\alpha}{L_r}+1\right);$$

and
a displacement formula at an external diameter ($\delta_T$) of the reinforcing ribs:

$$\delta_r = \frac{P_R D_r}{2E}\left(\frac{D_r^2+d_r^2}{D_r^2-d_r^2}-\mu\right),$$

and in order to meet requirements for a deformation coordination between the spherical hulls and the reinforcing ribs to realize $\delta_s=\delta_r$, a calculation formula of $L_r$ is:

$$L_r = \frac{r_1\cos\alpha}{\dfrac{r_1^2\sin\alpha(1-\mu)}{t_1 D_r\left(\dfrac{D_r^2+d_r^2}{D_r^2-d_r^2}-\mu\right)}-1}.$$

* * * * *